US011353035B2

(12) United States Patent
Hu et al.

(10) Patent No.: US 11,353,035 B2
(45) Date of Patent: Jun. 7, 2022

(54) BEARING ASSEMBLY, ROTOR ASSEMBLY AND DRAUGHT FAN

(71) Applicants: GUANGDONG WELLING MOTOR MANUFACTURING CO., LTD., Guangdong (CN); MIDEA WELLING MOTOR TECHNOLOGY (SHANGHAI) CO., LTD., Shanghai (CN)

(72) Inventors: Yiming Hu, Guangdong (CN); Tiantian Yan, Guangdong (CN)

(73) Assignees: GUANGDONG WELLING MOTOR MANUFACTURING CO., LTD., Foshan (CN); MIDEA WELLING MOTOR TECHNOLOGY (SHANGHAI) CO., LTD., Shanghai (CN)

( * ) Notice: Subject to any disclaimer, the term of this patent is extended or adjusted under 35 U.S.C. 154(b) by 325 days.

(21) Appl. No.: 16/677,853

(22) Filed: Nov. 8, 2019

(65) Prior Publication Data

US 2020/0362870 A1    Nov. 19, 2020

Related U.S. Application Data

(63) Continuation of application No. PCT/CN2019/102343, filed on Aug. 23, 2019.

(30) Foreign Application Priority Data

May 15, 2019    (CN) .......................... 201910401983.2

(51) Int. Cl.
*F04D 29/049* (2006.01)
*F16C 19/06* (2006.01)

(52) U.S. Cl.
CPC ............ *F04D 29/049* (2013.01); *F16C 19/06* (2013.01); *F16C 2360/46* (2013.01)

(58) Field of Classification Search
CPC .... F04D 29/049; F04D 29/059; F04D 29/563; F04D 29/266; F04D 25/08; H02K 11/012; H02K 11/022; H02K 11/02
See application file for complete search history.

(56) References Cited

U.S. PATENT DOCUMENTS

| 4,433,261 A | * | 2/1984 | Nashiki | ................. | H02K 1/278 |
| | | | | | 310/156.28 |
| 2006/0073042 A1 | * | 4/2006 | Stewart | ................. | F04D 29/059 |
| | | | | | 417/423.12 |

(Continued)

FOREIGN PATENT DOCUMENTS

| CN | 201663508 U | 12/2010 |
| CN | 202484079 U | 10/2012 |

(Continued)

OTHER PUBLICATIONS

Ball Bearing 69 Series by Ningbo Shilong Bearing Co., Ltd. Direct Industry, Feb. 2019 [retrieved on Nov. 18, 2021], Retrieved from the Internet: <URL: https://www.directindustry.com/prod/ningbo-shilong-bearing-co-ltd/product-188471-1851504.html>. (Year: 2019).*

(Continued)

*Primary Examiner* — Brian P Wolcott
*Assistant Examiner* — Jackson N Gillenwaters
(74) *Attorney, Agent, or Firm* — Scully Scott Murphy & Presser (57) ABSTRACT

The present disclosure provides a bearing assembly, a rotor assembly and a draught fan. The bearing assembly has a shaft sleeve and a shaft extending through the shaft sleeve. An inner wall of the shaft sleeve is provided with two grooves in a circumferential direction. The shaft is provided with two channels corresponding to the two grooves respec- (Continued)

tively. The channels and the grooves form two raceways. Multiple rolling bodies are disposed between the shaft and the shaft sleeve and movable in the raceways. The shaft sleeve has an outer diameter of 13 mm, and a portion of the shaft extending within the shaft sleeve has a diameter of 5 mm.

19 Claims, 3 Drawing Sheets

(56) References Cited

U.S. PATENT DOCUMENTS

| | | | | |
|---|---|---|---|---|
| 2010/0215491 | A1* | 8/2010 | Mockridge | F04D 29/0563 415/229 |
| 2015/0123511 | A1* | 5/2015 | Laskaris | H02K 11/0141 310/216.108 |
| 2016/0312826 | A1* | 10/2016 | Kawashima | F04D 29/058 |
| 2017/0058909 | A1 | 3/2017 | Barber et al. | |
| 2018/0316247 | A1* | 11/2018 | Andonian | H02K 11/012 |
| 2019/0010953 | A1* | 1/2019 | Takao | F04D 29/281 |

FOREIGN PATENT DOCUMENTS

| | | |
|---|---|---|
| CN | 103973002 A | 8/2014 |
| CN | 105024490 A | 11/2015 |
| CN | 107086687 A | 8/2017 |
| CN | 209856093 U | 12/2019 |
| EP | 1 134 423 B1 | 1/2006 |
| JP | S48-009857 B | 3/1973 |
| JP | H07-006523 U | 1/1995 |
| JP | 2001-140869 A | 5/2001 |
| KR | 10-2011-0112864 A | 10/2011 |
| KR | 10-2015-0136494 A | 12/2015 |

OTHER PUBLICATIONS

International Search Report and Written Opinion dated Mar. 2, 2020 received in International Patent Application No. PCT/CN2019/102343 together with an English language translation.

Notification of Reason for Refusal dated Jan. 12, 2021 received in Korean Patent Application No. KR 10-2020-7000603 together with an English language translation.

Notice of Reasons for Refusal dated Sep. 14, 2021 received in Japanese Patent Application No. JP 2019-560379 together with an English language translation.

* cited by examiner

BEARING ASSEMBLY, ROTOR ASSEMBLY AND DRAUGHT FAN

CROSS-REFERENCES TO RELATED APPLICATION

The present disclosure claims the priority of Chinese Patent Application No. 201910401983.2, filed with the Chinese Patent Office on May 15, 2019 and entitled "BEARING ASSEMBLY, ROTOR ASSEMBLY AND DRAUGHT FAN", the entire contents of which are herein incorporated by reference for all purposes. No new matter has been introduced.

FIELD

The present disclosure relates to the technical field of draught fans, and particularly relates to a bearing assembly, a rotor assembly and a draught fan.

BACKGROUND

A high-speed draught fan achieves good air blowing effect by a motor driving an impeller to rotate at high speed to form a negative pressure environment in a sealed case, which has the advantages of high rotation speed and small volume, and is applied more and more widely in the fields such as hand-held vacuum cleaners and blowers. Therefore, there is a relatively obvious development trend of the motor to high-speed and high-efficiency, and since the design of the bearing determines the limit rotation speed that the draught fan can reach, to design a bearing assembly suitable for popularization and application so as to improve the rotation speed of the draught fan becomes a technical problem that needs to be solved urgently.

SUMMARY

The present disclosure is intended to solve at least one of the technical problems existing in the prior art or the related art.

To this end, a first aspect of the present disclosure is to provide a bearing assembly.

A second aspect of the present disclosure is to provide a rotor assembly.

A third aspect of the present disclosure is to provide a further rotor assembly.

A fourth aspect of the present disclosure is to provide a draught fan.

In view of the above, according to one aspect of the present disclosure, there is provided a bearing assembly, comprising: a shaft sleeve, an inner wall of the shaft sleeve being provided with two grooves in a circumferential direction; a shaft, the shaft sleeve being sleeved on the shaft, the shaft being provided with channels corresponding to each of the two grooves, and the channel and the corresponding groove constituting a raceway; and a plurality of rolling bodies, disposed between the shaft and the shaft sleeve and moving in the raceways; wherein the shaft sleeve has an outer diameter of 13 mm, and a portion of the shaft disposed opposite to the shaft sleeve has a diameter of 5 mm.

The bearing assembly provided by the present disclosure comprises a shaft sleeve, a shaft and a plurality of rolling bodies, the inner wall of the shaft sleeve is provided with two grooves in the circumferential direction, the shaft sleeve is sleeved on the shaft, and the shaft is provided with channels corresponding to each of the two grooves, that is, the shaft is provided with two channels, and the corresponding channel and groove constitute a raceway, that is, the two channels and the two grooves constitute two raceways, by the plurality of rolling bodies being disposed between the shaft and the shaft sleeve and moving in each raceway, i.e., the plurality of rolling bodies in the two raceways, the shaft and the shaft sleeve constitute the bearing assembly, the structure of the existing standard bearing assembly is simplified, which is beneficial to the reduction of production cost, and by making the shaft sleeve have an outer diameter of 13 mm and the portion of the shaft disposed opposite to the shaft sleeve have a diameter of 5 mm, a draught fan having the bearing assembly can reliably operate at a rotation speed of at least 150000 rpm, which greatly increases the operation rotation speed of the draught fan having the bearing assembly, without increasing the production cost, and is beneficial to popularization and application.

Further, the channels are provided directly on the shaft, which can omit the radial dimension occupied by the shaft sleeve sleeved on the shaft, and is beneficial to the reduction of center distance of the rolling bodies of the bearing assembly and is beneficial to the increase of the limit rotation speed of the bearing assembly on the premise that the diameter of the shaft is not reduced, and further improves the operation rotation speed of the draught fan comprising the bearing assembly, and improves the use satisfaction of the user. Further, the two raceways are spaced apart in the axial direction of the shaft, and the plurality of rolling bodies are located in the two raceways to support the bearing on the outer circumference of the shaft, which is beneficial to the smooth, reliable and accurate movement of the shaft and the shaft sleeve relative to one another, and thereby is beneficial to the increase of the rotation speed of the bearing assembly, and improves the reliability of the bearing assembly.

Further, the individual bearing size of a bearing assembly used in a high-speed draught fan in the related art is $\Phi 13 \times \Phi 5$ mm, the outer diameter of the assembly is not less than 15 mm, and the rotation speed can reach 110000 rpm when a shaft having a shaft diameter of 5 mm is used. The individual bearing size of another bearing assembly is $\Phi 13 \times \Phi 4$ mm, the outer diameter of the assembly is not less than 15 mm, and the shaft diameter of the shaft used therein is 4 mm. The shaft diameter is relatively small, when a steel shaft is used, the overall rigidity is insufficient, and the bearing span and the axial length of the entire rotor will be greatly limited. Therefore, if a ceramic shaft with relatively good rigidity is used, the rotation speed can reach 120000 rpm, and if a ceramic ball is used as the rolling body, the rotation speed may be further increased to 130000 rpm. However, in the present disclosure, by sleeving a shaft sleeve on a shaft and disposing two sets of rolling bodies between the shaft and the shaft sleeve, the draught fan having the bearing assembly can reliably operate at a rotation speed of at least 150000 rpm, in the case where the out diameter of the shaft sleeve is 13 mm and the diameter of the portion of the shaft disposed opposite to the shaft sleeve is 5 mm, which greatly improves the operation rotation speed of the draught fan having the bearing assembly and improves the market competitiveness of the product, as compared with the prior art.

In addition, the bearing assembly in the technical solution provided by the present disclosure can also have the following additional technical features:

In the above-described technical solution, for example, the plane in which the spherical centers of the plurality of rolling bodies in the raceway are located collectively is a base surface; and the distance between the base surfaces of the two raceways ranges from 16 mm to 18 mm.

In the technical solution, the plane in which the spherical centers of the plurality of rolling bodies in the raceway are located collectively is a base surface, and the distance between the two base surfaces of the two raceways ranges from 16 mm to 18 mm, which can meet the requirement that the bearing assembly has a relatively large length in the axial direction of the shaft. Moreover, the two base surfaces of the two raceways can have other distances therebetween that meet the requirement, which leads to a wide application scope.

In any of the above-described technical solutions, for example, the plane in which the spherical centers of the plurality of rolling bodies in the raceway are located collectively is a base surface; and the distance between the base surfaces of the two raceways ranges from 10 mm to 12 mm.

In the technical solution, the plane in which the spherical centers of the plurality of rolling bodies in each raceway are located collectively is a base surface, and the distance between the two base surfaces of the two raceways ranges from 10 mm to 12 mm, which can meet the requirement that the bearing assembly has a relatively small length in the axial direction of the shaft. Moreover, the base surfaces of the two raceways can have other distances therebetween that meet the requirement, which leads to a wide application scope.

In any of the above-described technical solutions, for example, a cross section of any of the plurality of rolling bodies that is perpendicular to the axis of the shaft is a first circle, the track of the center of the first circle moving along the raceway is a second circle, and the second circle has a diameter of 6.4 mm; and the plurality of rolling bodies in the raceway are uniformly distributed in the circumferential direction of the shaft.

In the technical solution, the cross section of any of the plurality of rolling bodies that is perpendicular to the axis of the shaft is a first circle, the track of the center of the first circle moving along the raceway is a second circle, and the second circle has a diameter of 6.4 mm, that is, the center distance of the rolling bodies of the bearing assembly is 6.4 mm, which can avoid the case where if the distance is relatively small, the shaft diameter of the shaft will be relatively small, and then the rigidity of the shaft cannot be guaranteed, and also avoid the case where if the distance is relatively large, the rotation speed of the bearing assembly will be relatively low. The magnitude of the center distance of the rolling bodies of the bearing assembly is set reasonably, which can ensure the rigidity of the shaft, while enabling the bearing assembly to have a relatively high rotation speed, thus enabling the draught fan to have a relatively high rotation speed and operate reliably at a relatively high rotation speed.

Further, the plurality of rolling bodies in the raceway are uniformly distributed in the circumferential direction of the shaft, which enables the shaft and the shaft sleeve to be uniformly stressed in the circumferential direction of the shaft during rotation, thereby enabling the shaft and the shaft sleeve to rotate smoothly and reliably relative to one another, and further improving the reliability and service life of the product. Further, the rolling bodies may be spherical rolling bodies or cylindrical rolling bodies, or may be rolling bodies of other shapes that meet the requirement. Among them, the spherical rolling bodies can bear high-speed rotation and are suitable for the operation condition of high-speed rotation of the rotor assembly.

Further, the limit rotation speed of the bearing assembly mainly depends on the design of individual bearing, and the limit rotation speed of the individual bearing mainly depends on the magnitude of the center distance Dm of the rolling bodies. In general, the bearings with a Dm·n value ≥ $1.0 \times 10^6$ mm·r/min are referred to as high-speed bearings. Therefore, a relatively high rotation speed can be obtained by selecting a bearing assembly with a relatively small center distance. In the present disclosure, by setting the center distance of the rolling bodies of the bearing assembly to be 6.4 mm, a relatively high limit rotation speed can be realized while the rigidity of the shaft is ensured, thereby enabling the draught fan comprising the bearing assembly to have a relatively high operation speed, which effectively improves the market competitiveness of the product.

In any of the above-described technical solutions, for example, the shaft sleeve is constituted by at least one outer ring; and the at least one outer ring comprises a first outer ring and two second outer rings, one of the two second outer rings is disposed on an inner wall of one end of the first outer ring and the other of the two second outer rings is disposed on an inner wall of the other end of the first outer ring, and the grooves are provided on the second outer rings.

In the technical solution, the shaft sleeve is constituted by at least one outer ring, further, the shaft sleeve is constituted by one outer ring, i.e., the grooves are provided directly on the inner wall of the outer ring, which simplifies the structure of the bearing assembly, enables the outer ring to occupy a relatively small size in the radial direction, and is beneficial to increasing the thickness of the outer ring or reducing the outer diameter of the outer ring, i.e., beneficial to reducing the outer diameter of the shaft sleeve, so as to increase the overall rigidity of the product or reduce the weight of the bearing assembly, and improve the reliability and service life of the product.

The at least one outer ring comprises a first outer ring and two second outer rings, one of the two second outer rings is disposed on an inner wall of one end of the first outer ring and the other of the two second outer rings is disposed on an inner wall of the other end of the first outer ring, and the grooves are provided on the second outer rings, which reduces the requirement for the machining accuracy of the first outer ring and is favorable for production. Moreover, the first outer ring and the second outer rings in this structure are assembled members, and the axial distance between the two second outer rings can be adjusted to control the clearance and apply a pre-tension force.

In any of the above-described technical solutions, for example, the bearing assembly further comprises: a cage, by which the plurality of rolling bodies are uniformly disposed between the shaft and the shaft sleeve in the circumferential direction of the shaft.

In the technical solution, the plurality of rolling bodies are uniformly disposed between the shaft and the shaft sleeve in the circumferential direction of the shaft by a cage, and in this way, the plurality of rolling bodies are separated and uniformly distributed in the circumferential direction of the shaft by means of the cage, so that the shaft and the shaft sleeve are uniformly stressed in the circumferential direction of the shaft during rotation, which further enables the shaft and the shaft sleeve to rotate stably and reliably relative to one another, and further improves the reliability and the service life of the product.

In any of the above-described technical solutions, for example, the shaft is a through shaft; and the shaft is provided with a recess for receiving an adhesive.

In the technical solution, the shaft is a through shaft, that is, all the parts of the shaft except the channel shave a diameter of 5 mm. A through shaft has a lower processing difficulty than a stepped shaft, but a higher processing accuracy than the stepped shaft, and can also avoid the local feature of stress concentration easily occurring in a relief groove and the like in the case of the stepped shaft, which is beneficial to increasing the rigidity and the strength.

The shaft is provided with a recess, and by containing an adhesive in the recess, it is possible to reliably fix a structure connected to the shaft to the shaft, thereby improving the reliability of the product.

In any of the above-described technical solutions, for example, the plurality of rolling bodies and the shaft are both made of a metal material; or the shaft is made of a metal material, and the plurality of rolling bodies are made of a ceramic material.

In the technical solution, in one aspect, the rolling bodies and the shaft are both made of a metal material. The metal material is low in cost, which is beneficial to reducing the production cost of the product, making it possible to increase the limit rotation speed of the bearing assembly while greatly reducing the production cost, so as to increase the operation speed of the draught fan, and enabling the bearing assembly to operate reliably and stably at a relatively high rotation speed, which is beneficial to popularization and application. In one aspect, the shaft is made of a metal material, and the rolling bodies are made of a ceramic material, which can greatly increase the rotation speed of the draught fan with a small increase in production cost, and is suitable for popularization and application.

Further, when the rolling bodies and the shaft are both made of a metal material, the draught fan having the bearing assembly can reliably operate at a rotation speed of 150000 rpm; and when the shaft is made of a metal material and the rolling bodies are made of a ceramic material, the draught fan having the bearing assembly can reliably operate at a rotation speed of 160000 to 170000 rpm. For example, the metal through shaft with a diameter of 5 mm has a certain rigidity, can meet the design requirements of most small high-speed draught fans, and can greatly increase smooth operation rotation speed when matched with ceramic rolling bodies, and can also increase the limit rotation speed, and achieve certain economic efficiency.

In any of the above-described technical solutions, for example, the two raceways are provided with the same number of rolling bodies, and the number of rolling bodies disposed in either of the two raceways is 6 or 7.

In the technical solution, the two raceways are provided with the same number of rolling bodies, i.e., there are the same number of rolling bodies in the two raceways, which can further improve the reliability of the bearing assembly, the number of rolling bodies may be 6 or 7, and may also be other numbers that meet the requirement.

According to another aspect of the present disclosure, there is provided a rotor assembly, comprising the bearing assembly in any of the above-described technical solutions, and an impeller disposed on the shaft of the bearing assembly.

The rotor assembly provided by the present disclosure comprises the bearing assembly and an impeller disposed on the shaft of the bearing assembly. The rotor assembly comprises the bearing assembly of any of the above-described technical solutions, and therefore has all the advantageous effects of the bearing assembly, which will not be further described herein.

In any of the above-described technical solutions, for example, the impeller comprises a hub, a first end of the hub has a smaller cross-sectional area than a second end of the hub, and the shaft is mounted on the second end of the hub.

In the technical solution, the impeller comprises a hub, and by making the first end of the hub have a smaller cross-sectional area than the second end of the hub, and mounting the shaft on the second end of the hub, the hub has a gradually increased cross-sectional area in a direction of getting close to the shaft, which facilitates introducing the air flow from the first end away from the shaft to the second end via the outer surface of the hub, and also facilitates reducing the impact loss caused by the inlet air at the first end, thereby improving the operation efficiency.

In any of the above-described technical solutions, for example, the hub comprises a frustoconical portion and a ring portion, the ring portion is connected to one end of the frustoconical portion having a relatively large cross-sectional area; and an interior of the frustoconical portion is provided with a mounting portion, and the shaft passes through the ring portion to be connected to the mounting portion.

In the technical solution, the hub comprises a frustoconical portion and a ring portion, and the ring portion is connected to one end of the frustoconical portion having a relatively large cross-sectional area. The frustoconical portion enables a smooth transition of the outer circumferential surface of the hub from the first end to the second end, which further improves the air flow guiding efficiency and reduces the impact loss caused by the inlet air. Moreover, the ring portion is connected to one end of the frustoconical portion having a relatively large cross-sectional area, so that the second end of the hub is ring-shaped, and the outer surface can effectively cooperate with the blade structure of the impeller, which reduces the leakage of fluid from a flow passage into the inner cavity of the ring, thereby improving the operation efficiency. The interior of the frustoconical portion is provided with a mounting portion, and the shaft passes through the ring portion to be connected to the mounting portion. Connecting the shaft to the hub by the mounting portion can ensure coaxial arrangement of the shaft and the hub, thereby ensuring that the rotor assembly can rotate reliably and stably at high speed. The shaft passes through the ring portion to be connected to the mounting portion. The ring portion is a hollow structure and can serve as a balancing ring, i.e., it can be used as a cutting material for dynamic balance, so that there is no need to separately dispose a balancing ring at the impeller end of the rotor assembly, which effectively reduces the number of parts, simplifies the assembly process and reduces the production cost.

Further, the frustoconical portion is also a hollow structure, that is, the hub is a thin-walled structure, which can ensure the consistency of contraction when the impeller is molded, further reduces the rotational inertia of the impeller, and is beneficial to improving the operation efficiency.

In any of the above-described technical solutions, for example, the mounting portion is provided with a mounting hole, and the first end is provided with a through hole communicating with the mounting hole.

In the technical solution, the mounting portion is provided with a mounting hole, and the shaft is assembled in cooperation with the hub through the mounting hole, so that the coaxiality of the shaft and the hub is ensured. The first end of the hub is provided with a through hole communicating with the mounting hole, and the diameter of the through hole is smaller than the diameter of the mounting hole, so that air in the mounting portion is discharged from the through hole when the shaft is mounted to the hub, thereby preventing assembly errors caused by the mounting hole being a closed hole, which further ensures the coaxiality of the shaft and the hub and improves the smoothness of rotation. Moreover, the design of the through hole reduces materials, and thereby reduces the rotational inertia, which is beneficial to improving the rotation efficiency.

In any of the above-described technical solutions, for example, the plurality of rolling bodies in one of the two raceways close to the impeller are located at least partially within the ring portion.

In the technical solution, the plurality of rolling bodies in one of the two raceways close to the impeller are located at least partially within the ring portion. In one aspect, the plurality of rolling bodies in the raceway close to the impeller can intersect the cross section of the second end. In one aspect, the plurality of rolling bodies in the raceway close to the impeller are located between the cross section of the first end and the cross section of the second end, so that the support position between the shaft and the shaft sleeve in the bearing assembly is close to the center of gravity of the impeller, which can reduce the influence of the amount of unbalance of the impeller on the bearing assembly, thereby improving the reliability and service life of the product.

Further, if the axial dimension allows, the rolling elements should be brought as close as possible to the center of gravity of the impeller, so as to further reduce the influence of the amount of unbalance of the impeller on the bearing assembly and greatly improve the reliability of the product.

In any of the above-described technical solutions, for example, the length of a portion of the shaft connected to the mounting portion in the axial direction of the shaft is greater than or equal to 6 mm and smaller than or equal to 10 mm.

In the technical solution, the length of the portion of the shaft connected to the mounting portion in the axial direction of the shaft is greater than or equal to 6 mm and smaller than or equal to 10 mm. A reasonable length of the portion of the shaft connected to the mounting portion makes it possible to make full use of axial space, while ensuring the positioning reliability.

In any of the above-described technical solutions, for example, the impeller further comprises: blades mounted on the hub; the impeller being a mixed-flow impeller; and the number of blades being 7.

In the technical solution, the impeller further comprises blades mounted on the hub, and the blades are uniformly distributed on the outer circumferential surface of the hub in the circumferential direction of the shaft, so that the air flow generated by the blades when the hub rotates with the shaft is uniformly distributed in the circumferential direction of the shaft, and flows to the direction of a magnet assembly under the guiding of the frustoconical portion of the hub, thereby facilitating the stable and reliable rotation of the bearing assembly. Further, the impeller is a mixed-flow impeller, and the number of blades is 7. It can be understood that the blades may be in other numbers that meet the requirement.

According to yet another aspect of the present disclosure, there is provided a rotor assembly, comprising the bearing assembly in any of the above-described technical solutions; and a magnet assembly disposed on the shaft of the bearing assembly.

The rotor assembly provided in the present disclosure comprises a bearing assembly and a magnet assembly disposed on the shaft of the bearing assembly. The rotor assembly comprises the bearing assembly of any of the above-described technical solutions, and therefore has all the advantageous effects of the bearing assembly, which will not be further described herein. In any of the above-described technical solutions, for example, the magnet assembly further comprises: a magnetic ring; and a protective jacket comprising a balancing portion and a reinforcing portion, the balancing portion and the reinforcing portion being connected to each other and jointly covering an outer surface of a magnetic ring, wherein the balancing portion is located at one end of the magnetic ring.

In the technical solution, the magnet assembly comprises a protective jacket comprising a balancing portion and a reinforcing portion connected to each other and jointly covering the outer surface of the magnetic ring. The protective jacket can prevent the magnetic ring from being damaged and has a good protective effect, which can effectively improve the service life of the magnetic ring, and thereby improves the reliability of the product.

The balancing portion is located at one end of the magnetic ring. In one aspect, the balancing portion is located at the end away from the shaft sleeve, that is, the balancing portion is located at the end portion of the rotor assembly and away from the center of gravity of the rotor assembly, which facilitates weight removal, and thereby can improve the weight removal efficiency and reliability. In one aspect, the balancing portion is located at the end close to the shaft sleeve, that is, the balancing portion is provided between the bearing and the magnetic ring and close to the center of gravity of the rotor, which facilitates shortening the axial length and thereby makes full use of the axial space and enlarges the applicable scope of the product.

In any of the above-described technical solutions, for example, the protective jacket is an integrally formed structure; and the protective jacket is made of a non-magnetically conductive material.

In the technical solution, the protective jacket is an integrally formed structure, which is favorable for processing and is suitable for mass production. The protective jacket is made of a non-magnetically conductive material, which can prevent the rolling bodies from being magnetized easily to affect the service life of the bearing assembly in the case where the protective jacket is made of a magnetic material, and effectively improves the reliability of the product. The thickness of the reinforcing portion ranges from 0.2 mm to 0.3 mm, which can achieve good protective effect, and at the same time, can prevent the magnetic property of the magnetic ring from being weakened if the thickness of the reinforcing portion is relatively large. The thickness of the balancing portion is 1 mm, which can ensure good weight removal effect and improve the smoothness of rotation of the product.

Further, the reinforcing portion is fixed, by the spinning process, to the end surface of the end of the magnetic ring away from the balancing portion, so that the magnetic ring cannot be disassembled during high-speed operation, thereby improving the reliability of the product.

In any of the above-described technical solutions, for example, the magnet assembly comprises a magnetic ring sleeved on the shaft, and the distance between the magnetic ring and the shaft sleeve in the axial direction of the shaft is greater than or equal to 3 mm.

In the technical solution, the magnet assembly comprises a magnetic ring sleeved on the shaft, and the distance between the magnetic ring and the shaft sleeve in the axial direction of the shaft is greater than or equal to 3 mm, which can prevent the rolling bodies from being magnetized to affect the service life of the bearing assembly if the distance between the magnetic ring and the shaft sleeve in the axial direction of the shaft is relatively small. The reasonable distance between the magnetic ring and the shaft sleeve in the axial direction of the shaft can effectively ensure the reliability of the rolling bodies, thereby improving the service life of the product.

According to still another aspect of the present disclosure, there is provided a draught fan, comprising the bearing assembly according to any of the above-described technical solutions; or the rotor assembly comprising an impeller according to any of the above-described technical solutions; or the rotor assembly comprising a magnet assembly according to any of the above-described technical solutions.

The draught fan provided by the present disclosure comprises the bearing assembly of any of the above-described technical solutions, and therefore has all of the advantageous effects of the bearing assembly; or comprises the rotor assembly comprising an impeller in any of the above-described technical solutions, and therefore has all of the advantageous effects of the rotor assembly comprising an impeller; or comprises the rotor assembly comprising a magnet assembly in any of the above-described technical solutions, and therefore has all of the advantageous effects of the rotor assembly comprising a magnet assembly, which will not be described further here.

Additional aspects and advantages of the present disclosure will become apparent in the following description, or are understood by the practice of the present disclosure.

BRIEF DESCRIPTION OF THE DRAWINGS

The above and/or additional aspects and advantages of the present disclosure will become apparent and readily understood from the following descriptions of embodiments in combination with the drawings.

Figure 1:
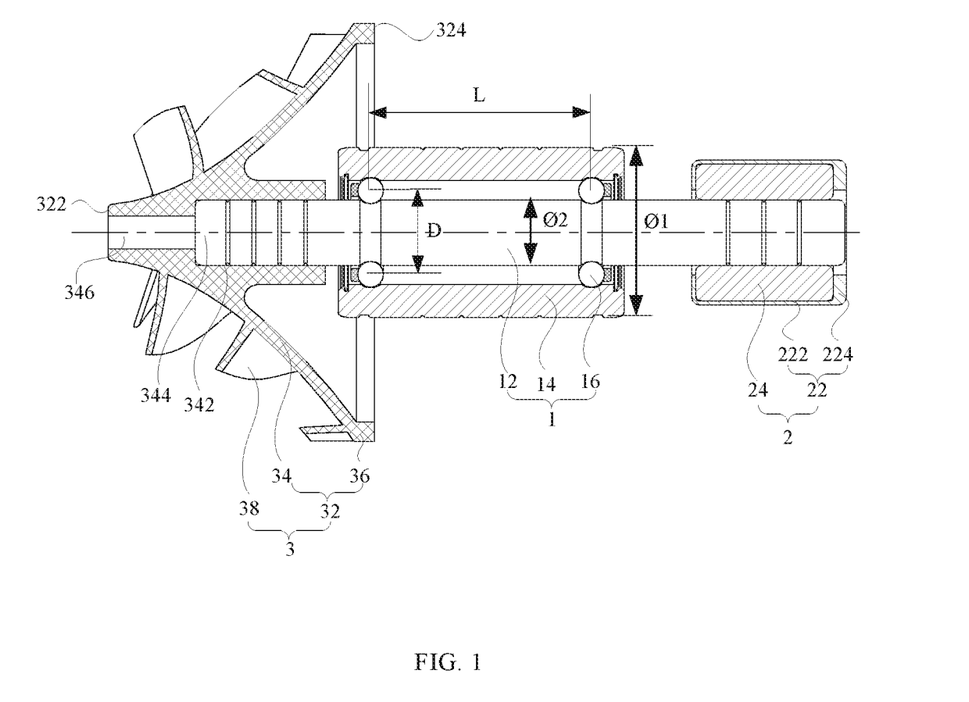
FIG. 1 is a sectional view of a portion of a draught fan according to an embodiment of the present disclosure.
Figure 2:
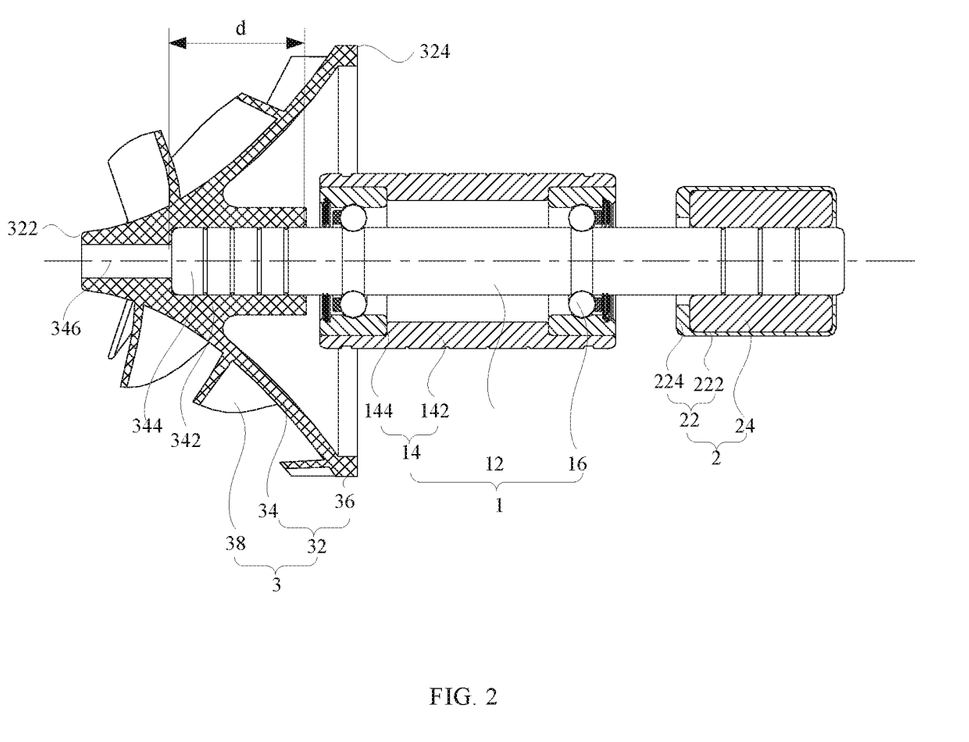
FIG. 2 is a sectional view of a portion of the draught fan according to another embodiment of the present disclosure.
Figure 3:
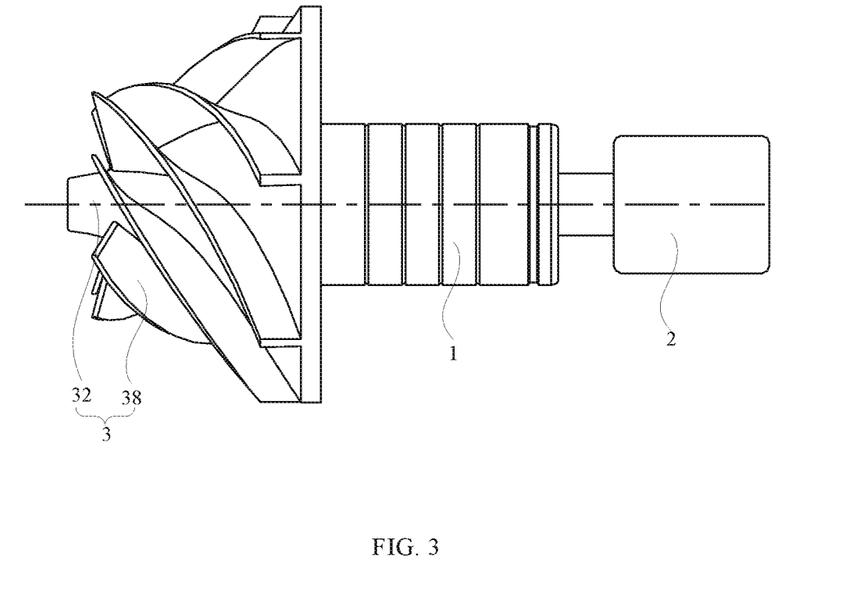
FIG. 3 is a schematic structural diagram of a portion of the draught fan according to an embodiment of the present disclosure.

The corresponding relationship between the reference signs and component names in FIGS. 1-3 are as follows:

1 bearing assembly, 12 shaft, 14 shaft sleeve, 142 first outer ring, 144 second outer ring, 16 rolling body, 2 magnet assembly, 22 protective jacket, 222 reinforcing portion, 224 balancing portion, 24 magnetic ring, 3 impeller, 32 hub, 322 first end, 324 second end, 34 frustoconical portion, 342 mounting portion, 344 mounting hole, 346 through hole, 36 ring portion, and 38 blade.

DETAILED DESCRIPTION

In order that the above-mentioned objectives, features and advantages of the present disclosure can be understood more clearly, a further detailed description of the present disclosure will be given below in connection with the accompanying drawings and exemplary embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners different from those described herein. Therefore, the protection scope of the present disclosure is not limited to the exemplary embodiments disclosed below.

A bearing assembly, a rotor assembly and a draught fan according to some embodiments of the present disclosure are described below with reference to FIGS. 1-3.

As shown in FIGS. 1-3, according to one aspect of the present disclosure, there is provided a rotor bearing assembly 1. The bearing assembly 1 comprises: a shaft sleeve 14, an inner wall of the shaft sleeve 14 being provided with two grooves in a circumferential direction; a shaft 12, the shaft sleeve 14 being sleeved on the shaft 12, the shaft 12 being provided with channels corresponding to each of the two grooves, and the channel and the corresponding groove constituting a raceway; and a plurality of rolling bodies 16, disposed between the shaft 12 and the shaft sleeve 14 and moving in the raceways; wherein the shaft sleeve 14 has an outer diameter of 13 mm, and a portion of the shaft 12 disposed opposite to the shaft sleeve 14 has a diameter of 5 mm.

The bearing assembly 1 provided by the present disclosure comprises a shaft sleeve 14, a shaft 12 and a plurality of rolling bodies 16, the inner wall of the shaft sleeve 14 is provided with two grooves in the circumferential direction, the shaft sleeve 14 is sleeved on the shaft 12, and the shaft 12 is provided with channels corresponding to each of the two grooves, that is, the shaft 12 is provided with two channels, and the corresponding channel and groove constitute a raceway, that is, the two channels and the two grooves constitute two raceways, by the plurality of rolling bodies 16 being disposed between the shaft 12 and the shaft sleeve 14 and moving in each raceway, i.e., the plurality of rolling bodies 16 in the two raceways, the shaft 12 and the shaft sleeve 14 constitute the bearing assembly 1, the structure of the existing standard bearing assembly 1 is simplified, which is beneficial to the reduction of production cost, as shown in FIG. 1, by making the shaft sleeve 14 have an outer diameter $\varnothing 1$ of 13 mm and the portion of the shaft 12 disposed opposite to the shaft sleeve 14 have a diameter $\varnothing 2$ of 5 mm, a draught fan having the bearing assembly 1 can reliably operate at a rotation speed of at least 150000 rpm, which greatly increases the operation rotation speed of the draught fan having the bearing assembly 1, without increasing the production cost, and is beneficial to popularization and application. It has been discovered through experiments that, by providing the outer diameter of the shaft sleeve 14 at 13 mm and at the same time providing the diameter of the portion of the shaft 12 (extending within the passageway of the shaft sleeve 14) at 5 mm, the rotation speed of at least 150000 rpm can be unexpectedly achieved, and further maintained during operation, by the bearing assembly, without increasing the cost on material and energy input of bearing assembly.

Further, the channels are provided directly on the shaft 12, which can omit the radial dimension occupied by the shaft sleeve 14 sleeved on the shaft 12, and is beneficial to the reduction of center distance of the rolling bodies 16 of the bearing assembly 1 and is beneficial to the increase of the limit rotation speed of the bearing assembly 1 on the premise that the diameter of the shaft is not reduced, and further improves the operation rotation speed of the draught fan comprising the bearing assembly 1, and improves the use satisfaction of the user. Further, the two raceways are spaced apart in the axial direction of the shaft 12, and the plurality of rolling bodies 16 are located in the two raceways to support the bearing on the outer circumference of the shaft 12, which is beneficial to the smooth, reliable and accurate movement of the shaft 12 and the shaft sleeve 14 relative to one another, and thereby is beneficial to the increase of the rotation speed of the bearing assembly 1, and improves the reliability of the bearing assembly 1.

Further, the individual bearing size of a bearing assembly used in a high-speed draught fan in the related art is Φ13×Φ5 mm, the outer diameter of the assembly is not less than 15 mm, and the rotation speed can reach 110000 rpm when a shaft having a shaft diameter of 5 mm is used. The individual bearing size of another bearing assembly is Φ13×Φ4 mm, the outer diameter of the assembly is not less than 15 mm, and the shaft diameter of the shaft used therein is 4 mm. The shaft diameter is relatively small, when a steel shaft is used, the overall rigidity is insufficient, and the bearing span and the axial length of the entire rotor will be greatly limited. Therefore, if a ceramic shaft with relatively good rigidity is used, the rotation speed can reach 120000 rpm, and if a ceramic ball is used as the rolling body 16, the rotation speed may be further increased to 130000 rpm. However, in the present disclosure, by sleeving a shaft sleeve 14 on a shaft 12 and disposing two sets of rolling bodies 16 between the shaft 12 and the shaft sleeve 14, the draught fan having the bearing assembly 1 can reliably operate at a rotation speed of at least 150000 rpm, in the case where the out diameter Ø1 of the shaft sleeve 14 is 13 mm and the diameter Ø2 of the portion of the shaft 12 disposed opposite to the shaft sleeve 14 is 5 mm, which greatly improves the operation rotation speed of the draught fan having the bearing assembly 1 and improves the market competitiveness of the product, as compared with the prior art.

As shown in FIG. 1, in one embodiment of the present disclosure, for example, the plane in which the spherical centers of the plurality of rolling bodies 16 in the raceway are located collectively is a base surface; and the distance between the base surfaces of the two raceways ranges from 16 mm to 18 mm.

In the embodiment, the plane in which the spherical centers of the plurality of rolling bodies 16 in the raceway are located collectively is a base surface, and the distance L between the two base surfaces of the two raceways ranges from 16 mm to 18 mm. This distance meets the requirement that the bearing assembly 1 has a relatively large length in the axial direction of the shaft 12, which is suitable for certain applications of the bearing assembly, such as, hand-held vacuum cleaners and blowers. It has been discovered that, in addition to providing the outer diameter of the shaft sleeve 14 at 13 mm and providing the diameter of the portion of the shaft 12 at 5 mm, the provision of the distance between the two base surfaces in the range of 16 mm to 18 mm further ensures, unexpectedly, the rotation speed of at least 150000 rpm for the bearing assembly, without increasing the cost on material of the bearing assembly and the energy input for the draught fan utilizing the bearing assembly.

In one embodiment of the present disclosure, for example, the plane in which the spherical centers of the plurality of rolling bodies 16 in the raceway are located collectively is a base surface; and the distance between the base surfaces of the two raceways ranges from 10 mm to 12 mm.

In the embodiment, the plane in which the spherical centers of the plurality of rolling bodies 16 in each raceway are located collectively is a base surface, and the distance L between the two base surfaces of the two raceways ranges from 10 mm to 12 mm. This distance meets the requirement that the bearing assembly 1 has a relatively small length in the axial direction of the shaft 12, which is suitable for certain applications of the bearing assembly, such as, hand-held vacuum cleaners and blowers. It has been discovered that, in addition to providing the outer diameter of the shaft sleeve 14 at 13 mm and providing the diameter of the portion of the shaft 12 at 5 mm, the provision of the distance between the two base surfaces in the range of 10 mm to 12 mm further ensures, unexpectedly, the rotation speed of at least 150000 rpm for the bearing assembly, without increasing the cost on material of the bearing assembly and the energy input for the draught fan utilizing the bearing assembly.

As shown in FIG. 1, in one embodiment of the present disclosure, for example, a cross section of any of the plurality of rolling bodies 16 that is perpendicular to a longitudinal axis of the shaft 12 is a first circle, the track of the center of the first circle moving along the raceway is a second circle, and the second circle has a diameter of 6.4 mm; and the plurality of rolling bodies 16 in the raceway are uniformly distributed in the circumferential direction of the shaft 12.

In the embodiment, the cross section of any of the plurality of rolling bodies 16 that is perpendicular to the longitudinal axis of the shaft 12 is a first circle, the track of the center of the first circle moving along the raceway is a second circle, and the second circle has a diameter of 6.4 mm, that is, the center distance D of the rolling bodies 16 of the bearing assembly 1 is 6.4 mm, which can avoid the case where if the distance is relatively small, the shaft diameter of the shaft 12 will be relatively small, and then the rigidity of the shaft 12 cannot be guaranteed, and also avoid the case where if the distance is relatively large, the rotation speed of the bearing assembly 1 will be relatively low. The magnitude of the center distance of the rolling bodies 16 of the bearing assembly 1 is set reasonably, which can ensure the rigidity of the shaft 12, while enabling the bearing assembly 1 to have a relatively high rotation speed, thus enabling the draught fan to have a relatively high rotation speed and operate reliably at a relatively high rotation speed.

Further, the plurality of rolling bodies 16 in the raceway are uniformly distributed in the circumferential direction of the shaft 12, which enables the shaft 12 and the shaft sleeve 14 to be uniformly stressed in the circumferential direction of the shaft 12 during rotation, thereby enabling the shaft 12 and the shaft sleeve 14 to rotate smoothly and reliably relative to one another, and further improving the reliability and service life of the product. Further, the rolling bodies 16 may be spherical rolling bodies 16 or cylindrical rolling bodies 16, or may be rolling bodies 16 of other shapes that meet the requirement. Among them, the spherical rolling bodies 16 can bear high-speed rotation and are suitable for the operation condition of high-speed rotation of the rotor assembly.

Further, the limit rotation speed of the bearing assembly 1 mainly depends on the design of individual bearing, and the limit rotation speed of the individual bearing mainly depends on the magnitude of the center distance Dm of the rolling bodies 16. In general, the bearings with a Dm·n≥value $1.0 \times 10^6$ mm·r/min are referred to as high-speed bearings.

Therefore, a relatively high rotation speed can be obtained by selecting a bearing assembly 1 with a relatively small center distance. In the present disclosure, by setting the center distance of the rolling bodies 16 of the bearing assembly 1 to be 6.4 mm, a relatively high limit rotation speed can be realized while the rigidity of the shaft 12 is ensured, thereby enabling the draught fan comprising the bearing assembly 1 to have a relatively high operation speed, which effectively improves the market competitiveness of the product. It has been discovered that, in addition to providing the outer diameter of the shaft sleeve 14 at 13 mm, providing the diameter of the portion of the shaft 12 at 5 mm and providing the distance between the two base surfaces in the range of 10 mm to 12 mm or 16 mm to 18 mm, the provision of the center distance of the rolling bodies 16 of the bearing assembly at 6.4 mm further ensures the rotation speed of at least 150000 rpm for the bearing assembly, without increasing the cost on material of the bearing assembly and the energy input for the draught fan utilizing the bearing assembly.

As shown in FIGS. 1-2, in one embodiment of the present disclosure, for example, the shaft sleeve 14 is constituted by at least one outer ring; and the at least one outer ring comprises a first outer ring 142 and two second outer rings 144, one of the two second outer rings 144 is disposed on an inner wall of one end of the first outer ring 142 and the other of the two second outer rings 144 is disposed on an inner wall of the other end of the first outer ring 142, and the grooves are provided on the second outer rings 144.

In the embodiment, the shaft sleeve 14 is constituted by at least one outer ring, further, the shaft sleeve 14 is constituted by one outer ring, as shown in FIG. 1, i.e., the grooves are provided directly on the inner wall of the outer ring, which simplifies the structure of the bearing assembly 1, enables the outer ring to occupy a relatively small size in the radial direction, and is beneficial to increasing the thickness of the outer ring or reducing the outer diameter of the outer ring, i.e., beneficial to reducing the outer diameter of the shaft sleeve 14, so as to increase the overall rigidity of the product or reduce the weight of the bearing assembly 1, and improve the reliability and service life of the product.

As shown in FIG. 2, the at least one outer ring comprises a first outer ring 142 and two second outer rings 144, one of the two second outer rings 144 is disposed on an inner wall of one end of the first outer ring 142 and the other of the two second outer rings 144 is disposed on an inner wall of the other end of the first outer ring 142, and the grooves are provided on the second outer rings 144, which reduces the requirement for the machining accuracy of the first outer ring 142 and is favorable for production. Moreover, the first outer ring 142 and the second outer rings 144 in this structure are assembled members, and the axial (shaft 12) distance between the two second outer rings 144 can be adjusted to control the clearance and apply a pre-tension force.

In one embodiment of the present disclosure, for example, the bearing assembly 1 further comprises: a cage, by which the plurality of rolling bodies 16 are uniformly disposed between the shaft 12 and the shaft sleeve 14 in the circumferential direction of the shaft 12.

In the embodiment, the plurality of rolling bodies 16 are uniformly disposed between the shaft 12 and the shaft sleeve 14 in the circumferential direction of the shaft 12 by a cage, and in this way, the plurality of rolling bodies 16 are separated and uniformly distributed in the circumferential direction of the shaft 12 by means of the cage, so that the shaft 12 and the shaft sleeve 14 are uniformly stressed in the circumferential direction of the shaft 12 during rotation, which further enables the shaft 12 and the shaft sleeve 14 to rotate stably and reliably relative to one another, and further improves the reliability and the service life of the product.

In one embodiment of the present disclosure, for example, the shaft 12 is a through shaft; and the shaft 12 is provided with a recess for receiving an adhesive.

In the embodiment, the shaft 12 is a through shaft, that is, all the parts of the shaft 12 except the channel shave a diameter of 5 mm. A through shaft has a lower processing difficulty than a stepped shaft, but a higher processing accuracy than the stepped shaft, and can also avoid the local feature of stress concentration easily occurring in a relief groove and the like in the case of the stepped shaft, which is beneficial to increasing the rigidity and the strength.

The shaft 12 is provided with a recess, and by containing an adhesive in the recess, it is possible to reliably fix a structure connected to the shaft 12 to the shaft 12, thereby improving the reliability of the product.

In one embodiment of the present disclosure, for example, the plurality of rolling bodies 16 and the shaft 12 are both made of a metal material; or the shaft 12 is made of a metal material, and the plurality of rolling bodies 16 are made of a ceramic material.

In the embodiment, in one aspect, the rolling bodies 16 and the shaft 12 are both made of a metal material. The metal material is low in cost, which is beneficial to reducing the production cost of the product, making it possible to increase the limit rotation speed of the bearing assembly 1 while greatly reducing the production cost, so as to increase the operation speed of the draught fan, and enabling the bearing assembly 1 to operate reliably and stably at a relatively high rotation speed, which is beneficial to popularization and application. In one aspect, the shaft 12 is made of a metal material, and the rolling bodies 16 are made of a ceramic material, which can greatly increase the rotation speed of the draught fan with a small increase in production cost, and is suitable for popularization and application.

Further, when the rolling bodies 16 and the shaft 12 are both made of a metal material, the draught fan having the bearing assembly 1 can reliably operate at a rotation speed of 150000 rpm; and when the shaft 12 is made of a metal material and the rolling bodies 16 are made of a ceramic material, the draught fan having the bearing assembly 1 can reliably operate at a rotation speed of 160000 to 170000 rpm. For example, the metal through shaft 12 with a diameter of 5 mm has a certain rigidity, can meet the design requirements of most small high-speed draught fans, and can greatly increase smooth operation rotation speed when matched with ceramic rolling bodies 16, and can also increase the limit rotation speed, and achieve certain economic efficiency.

In one embodiment of the present disclosure, for example, the two raceways are provided with the same number of rolling bodies 16, and the number of rolling bodies 16 disposed in either of the two raceways is 6 or 7.

In the embodiment, the two raceways are provided with the same number of rolling bodies 16, i.e., there are the same number of rolling bodies 16 in the two raceways, which can further improve the reliability of the bearing assembly 1, the number of rolling bodies 16 may be 6 or 7, and may also be other numbers that meet the requirement.

According to another aspect of the present disclosure, there is provided a rotor assembly, comprising the bearing assembly 1 in any of the above-described embodiments, and an impeller 3 disposed on the shaft 12 of the bearing assembly 1.

The rotor assembly provided by the present disclosure comprises the bearing assembly 1 and the impeller 3 disposed on the shaft 12 of the bearing assembly 1. The rotor assembly comprises the bearing assembly 1 of any of the above-described embodiments, and therefore has all the advantageous effects of the bearing assembly 1, which will not be further described herein.

Further, an adhesive is contained in the recess on the shaft 12 of the bearing assembly 1 to firmly fix the impeller 3 to one end of the shaft 12.

As shown in FIGS. 1-2, in one embodiment of the present disclosure, for example, the impeller 3 comprises a hub 32, a first end 322 of the hub 32 has a smaller cross-sectional area than a second end 324 of the hub 32, and the shaft 12 is mounted on the second end 324 of the hub 32.

In the embodiment, the impeller 3 comprises the hub 32, and by making the first end 322 of the hub 32 have a smaller cross-sectional area than the second end 324 of the hub 32, and mounting the shaft 12 on the second end 324 of the hub 32, the hub 32 has a gradually increased cross-sectional area in a direction of getting close to the shaft 12, which facilitates introducing the air flow from the first end 322 away from the shaft 12 to the second end 324 via the outer surface of the hub 32, and also facilitates reducing the impact loss caused by the inlet air at the first end 322, thereby improving the operation efficiency.

As shown in FIGS. 1-2, in one embodiment of the present disclosure, for example, the hub 32 comprises a cone portion 34 and a ring portion 36, the ring portion 36 is connected to one end of the frustoconical portion 34 having a relatively large cross-sectional area; and an interior of the frustoconical portion 34 is provided with a mounting portion 342, and the shaft 12 passes through the ring portion 36 to be connected to the mounting portion 342.

In the embodiment, the hub 32 comprises the frustoconical portion 34 and the ring portion 36, and the ring portion 36 is connected to one end of the frustoconical portion 34 having a relatively large cross-sectional area. The frustoconical portion 34 enables a smooth transition of the outer circumferential surface of the hub 32 from the first end 322 to the second end 324, which further improves the air flow guiding efficiency and reduces the impact loss caused by the inlet air. Moreover, the ring portion 36 is connected to one end of the frustoconical portion 34 having a relatively large cross-sectional area, so that the second end 324 of the hub 32 is ring-shaped, and the outer surface can effectively cooperate with the blade structure of the impeller 3, which reduces the leakage of fluid from a flow passage into the inner cavity of the ring, thereby improving the operation efficiency. The interior of the frustoconical portion 34 is provided with a mounting portion 342, and the shaft 12 passes through the ring portion 36 to be connected to the mounting portion 342. Connecting the shaft 12 to the hub 32 by the mounting portion 342 can ensure coaxial arrangement of the shaft 12 and the hub 32, thereby ensuring that the rotor assembly can rotate reliably and stably at high speed. The shaft 12 passes through the ring portion 36 to be connected to the mounting portion 342. The ring portion 36 is a hollow structure and can serve as a balancing ring, i.e., it can be used as a cutting material for dynamic balance, so that there is no need to separately dispose a balancing ring at the impeller 3 end of the rotor assembly, which effectively reduces the number of parts, simplifies the assembly process and reduces the production cost.

Further, the frustoconical portion 34 is also a hollow structure, that is, the hub 32 is a thin-walled structure, which can ensure the consistency of contraction when the impeller 3 is molded, further reduces the rotational inertia of the impeller 3, and is beneficial to improving the operation efficiency.

As shown in FIGS. 1-2, in one embodiment of the present disclosure, for example, the mounting portion 342 is provided with a mounting hole 344, and the first end 322 is provided with a through hole 346 communicating with the mounting hole 344.

In the embodiment, the mounting portion 342 is provided with a mounting hole 344, and the shaft 12 is assembled in cooperation with the hub 32 through the mounting hole 344, so that the coaxiality of the shaft 12 and the hub 32 is ensured. The first end 322 of the hub 32 is provided with a through hole 346 communicating with the mounting hole 344, and the diameter of the through hole 346 is smaller than the diameter of the mounting hole 344, so that air in the mounting portion 342 is discharged from the through hole 346 when the shaft 12 is mounted to the hub 32, thereby preventing assembly errors caused by the mounting hole 344 being a closed hole, which further ensures the coaxiality of the shaft 12 and the hub 32 and improves the smoothness of rotation. Moreover, the design of the through hole 346 reduces materials, and thereby reduces the rotational inertia, which is beneficial to improving the rotation efficiency.

As shown in FIGS. 1-2, in one embodiment of the present disclosure, for example, the plurality of rolling bodies 16 in one of the two raceways close to the impeller 3 are located at least partially within the ring portion 36.

In the embodiment, the plurality of rolling bodies 16 in one of the two raceways close to the impeller 3 are located at least partially within the ring portion 36. In one aspect, the plurality of rolling bodies 16 in the raceway close to the impeller 3 can intersect the cross section of the second end 324 surface. In one aspect, the plurality of rolling bodies 16 in the raceway close to the impeller 3 are located between the cross section of the first end 322 and the cross section of the second end 324, so that the support position between the shaft 12 and the shaft sleeve 14 in the bearing assembly 1 is close to the center of gravity of the impeller 3, which can reduce the influence of the amount of unbalance of the impeller 3 on the bearing assembly 1, thereby improving the reliability and service life of the product.

Further, if the axial dimension allows, the rolling elements should be brought as close as possible to the center of gravity of the impeller 3, so as to further reduce the influence of the amount of unbalance of the impeller 3 on the bearing assembly 1 and greatly improve the reliability of the product.

As shown in FIG. 2, in one embodiment of the present disclosure, for example, the length of a portion of the shaft 12 connected to the mounting portion 342 in the axial direction of the shaft 12 is greater than or equal to 6 mm and smaller than or equal to 10 mm.

In the embodiment, the length d of the portion of the shaft 12 connected to the mounting portion 342 in the axial direction of the shaft 12 is greater than or equal to 6 mm and smaller than or equal to 10 mm. A reasonable length of the portion of the shaft 12 connected to the mounting portion 342 makes it possible to make full use of axial space, while ensuring the positioning reliability.

As shown in FIGS. 1-3, in one embodiment of the present disclosure, for example, the impeller 3 further comprises: blades 38 mounted on the hub 32; the impeller 3 being a mixed-flow impeller; and the number of the blades 38 being 7.

In the embodiment, the impeller 3 further comprises the blades 38 mounted on the hub 32, and the blades 38 are uniformly distributed on the outer circumferential surface of the hub 32 in the circumferential direction of the shaft 12, so that the air flow generated by the blades 38 when the hub 32 rotates with the shaft 12 is uniformly distributed in the circumferential direction of the shaft 12, and flows to the direction of the bearing assembly 1 under the guiding of the frustoconical portion 34 of the hub 32, thereby facilitating the stable and reliable rotation of the rotor assembly.

Further, the impeller 3 is a mixed-flow impeller, and the number of the blades 38 is 7. It can be understood that the blades 38 may be in other numbers that meet the requirement.

According to yet another aspect of the present disclosure, there is provided a rotor assembly, comprising the bearing assembly 1 in any of the above-described embodiments; and a magnet assembly 2 disposed on the shaft 12 of the bearing assembly 1.

The rotor assembly provided in the present disclosure comprises a bearing assembly 1 and a magnet assembly 2 disposed on the shaft 12 of the bearing assembly 1. The rotor assembly comprises the bearing assembly 1 of any of the above-described embodiments, and therefore has all the advantageous effects of the bearing assembly 1, which will not be further described herein.

Further, an adhesive is contained in the recess on the shaft 12 of the bearing assembly 1 to firmly fix the magnet assembly 2 to one end of the shaft 12.

As shown in FIGS. 1-2, in one embodiment of the present disclosure, for example, the magnet assembly 2 further comprises: a magnetic ring 24; and a protective jacket 22 comprising a balancing portion 224 and a reinforcing portion 222, the balancing portion 224 and the reinforcing portion 222 being connected to each other and jointly covering an outer surface of the magnetic ring 24, wherein the balancing portion 224 is located at one end of the magnetic ring 24.

In the embodiment, the magnet assembly 2 comprises the protective jacket 22, which comprises the balancing portion 224 and the reinforcing portion 222. The balancing portion 224 and the reinforcing portion 222 are connected to each other and jointly cover the outer surface of the magnetic ring 24. The protective jacket 22 can prevent the magnetic ring 24 from being damaged and has a good protective effect, which can effectively improve the service life of the magnetic ring 24, and thereby improves the reliability of the product.

The balancing portion 224 is located at one end of the magnetic ring 24. In one aspect, the balancing portion 224 is located at the end away from the shaft sleeve 14, that is, the balancing portion 224 is located at the end portion of the rotor assembly and away from the center of gravity of the rotor assembly, which facilitates weight removal, and thereby can improve the weight removal efficiency and reliability. In another aspect, the balancing portion 224 is located at the end close to the shaft sleeve 14, that is, the balancing portion 224 is provided between the bearing assembly 1 and the magnetic ring 24 and close to the center of gravity of the rotor, which facilitates shortening the axial length and thereby makes full use of the axial space and enlarges the applicable scope of the product.

In one embodiment of the present disclosure, for example, the protective jacket 22 is an integrally formed structure; and the protective jacket 22 is made of a non-magnetically conductive material.

In the embodiment, the protective jacket 22 is an integrally formed structure, which is favorable for processing and is suitable for mass production. The protective jacket 22 is made of a non-magnetically conductive material, which can prevent the rolling bodies 16 from being magnetized easily to affect the service life of the bearing assembly 1 in the case where the protective jacket 22 is made of a magnetic material, and effectively improves the reliability of the product. The thickness of the reinforcing portion 222 ranges from 0.2 mm to 0.3 mm, which can achieve good protective effect, and at the same time, can prevent the magnetic property of the magnetic ring 24 from being weakened if the thickness of the reinforcing portion 222 is relatively large. The thickness of the balancing portion 224 is 1 mm, which can ensure good weight removal effect and improve the smoothness of rotation of the product.

Further, the reinforcing portion 222 is fixed, by the spinning process, to the end surface of the end of the magnetic ring 24 away from the balancing portion 224, so that the magnetic ring 24 cannot be disassembled during high-speed operation, thereby improving the reliability of the product.

As shown in FIG. 2, in one embodiment of the present disclosure, for example, the magnet assembly 2 comprises the magnetic ring 24 sleeved on the shaft 12, and the distance between the magnetic ring 24 and the shaft sleeve 14 in the axial direction of the shaft 12 is greater than or equal to 3 mm.

In the embodiment, the magnet assembly 2 comprises the magnetic ring 24 sleeved on the shaft 12, and the distance between the magnetic ring 24 and the shaft sleeve 14 in the axial direction of the shaft 12 is greater than or equal to 3 mm, which can prevent the rolling bodies 16 from being magnetized to affect the service life of the bearing assembly 1 if the distance between the magnetic ring 24 and the shaft sleeve 14 in the axial direction of the shaft 12 is relatively small. The reasonable distance between the magnetic ring 24 and the shaft sleeve 14 in the axial direction of the shaft 12 can effectively ensure the reliability of the rolling bodies 16, thereby improving the service life of the product.

In an exemplary embodiment, with the increase of the rotation speed of the motor, the requirements for the assembly accuracy, installation rigidity and dynamic balance design of the entire rotor system are higher and higher. The design of the impeller 3 determines the efficiency of the draught fan within a specified rotation speed range, and the design of the rotor assembly determines the comprehensive performance of the motor such as noise, vibration and service life, so that there are still many problems in the design and manufacture of high-speed draught fans. At present, the rotor assembly structures of high-speed draught fans on the market are divided into single-side support type and double-end support type by whether two bearings are disposed on the same side of the rotor. For the manner of single-side support, the bearing assembly is generally used, that is, a pair of bearing inner rings are fixed to the shaft, and the outer rings are fixed to the shaft sleeve, and the shaft extends towards both ends of the shaft sleeve and supports the impeller and the rotor, respectively. This manner makes it easy to guarantee coaxiality, leads to good assembling property, and is more suitable for the application scenarios with super-high rotation speed than the manner of double-end bearing.

Therefore, the present disclosure may also propose a rotor assembly comprising an impeller 3, a bearing assembly 1 and a magnet assembly 2. The bearing assembly 1 comprises a shaft 12 and a shaft sleeve 14 disposed coaxially with the shaft 12, the impeller 3 and the magnet assembly 2 are fixed to both ends of the shaft 12 extending from the shaft sleeve 14, respectively, and are disposed substantially in parallel in the axial direction of the shaft 12. The plurality of rolling bodies 16 within the two raceways are disposed between the shaft 12 and the shaft sleeve 14 such that the shaft 12 and the shaft sleeve 14 can rotate relative to each other. The two raceways are spaced apart in the axial direction of the shaft 12. A plurality of spherical rolling bodies 16 uniformly disposed in the circumferential direction of the shaft 12 are provided in each raceway, the rolling bodies 16 are defined between the shaft 12 and the shaft sleeve 14 by a cage, and the two raceways have the same number of rolling bodies 16. By simplifying the structure of the bearing assembly 1, the production cost is reduced. For example, the impeller 3 is a mixed-flow impeller, the shaft sleeve 14 has an outer diameter of 13 mm and the portion of the shaft 12 disposed opposite to the shaft sleeve 14 has a diameter of 5 mm, so that without an increase in cost of the rotor assembly, a draught fan having the rotor assembly can reliably operate at a rotation speed of at least 150000 rpm, which greatly increases the operation rotation speed of the rotor assembly, enables the rotor assembly to operate reliably and stably at a relatively high speed, and is beneficial to popularization and application.

In an exemplary embodiment, the impeller 3 comprises the hub 32 have a substantially conical outer circumferential surface and the blades 38 disposed at intervals on the outer circumferential surface of the hub 32 in the circumferential direction of the shaft 12. The hub 32 is a thin-walled structure, which can ensure the consistency of contraction when the impeller 3 is molded, and can also reduce the rotational inertia of the impeller 3 and improve the operation efficiency. The hub 32 comprises the frustoconical portion 34 and the ring portion 36, the first end 322 of the frustoconical portion 34 has a smaller cross-sectional area than the second end 324 of the frustoconical portion 34, the ring portion 36 is connected to the second end 324, and the shaft 12 passes through the ring portion 36 to be mounted on the second end 324 of the hub 32. That is, the first end 322 of the frustoconical portion 34 of the hub 32 has the smallest diameter, the second end 324 of the frustoconical portion 34 has the largest diameter, and the outer and inner circumferential surfaces of the hub 32 smoothly transition from the first end 322 to the second end 324, and the outer circumferential surface being smooth plays a very good role in flow guiding. The interior of the frustoconical portion 34 is provided with a mounting portion 342 coaxial with the shaft 12 and having a mounting hole 344, the mounting portion 342 extends from the first end 322 to the second end 324 and does not exceed the ring portion 36, and a cavity is formed between the inner surface of the frustoconical portion 34 and the mounting portion 342. The first end 322 is provided with a through hole 346 communicating with the mounting hole 344, so that air in the mounting portion 342 is discharged from the through hole 346 when the shaft 12 is mounted to the hub 32, thereby preventing assembly errors caused by the mounting hole 344 being a closed hole, which further ensures the coaxiality of the shaft 12 and the hub 32 and improves the smoothness of rotation. Moreover, the design of the through hole 346 reduces materials, and thereby reduces the rotational inertia, which is beneficial to improving the rotation efficiency.

One end of the hub 32 close to the shaft 12 is the ring portion 36, i.e., the end surface at the position of the maximum diameter of the hub 32 is ring-shaped, the inner and outer circumferences of the ring extend away from the first end 322 from the positions of the maximum diameter of the inner and outer circumferential surfaces of the frustoconical portion 34 of the hub 32, respectively, and a cavity is defined by the end surface and the inner circumferential surface of the ring portion 36 and the mounting portion 342. The arc outer surface can effectively cooperate with the blade structure of the impeller 3 to reduce the leakage of fluid from a flow passage into the inner cavity of the ring, thereby improving the operation efficiency. Moreover, due to the presence of the cavity, the ring can act as a balancing ring, i.e., it can be used as a cutting material for dynamic balance, so that there is no need to separately dispose a balancing ring at the impeller 3 end of the rotor assembly, which effectively reduces the number of parts, simplifies the assembly process and reduces the production cost.

In an exemplary embodiment, the plurality of rolling bodies 16 in one of the two raceways close to the impeller 3 are located at least partially within the arc portion. In one aspect, the plurality of rolling bodies 16 in the raceway close to the impeller 3 can intersect the cross section of the second end 324. In one aspect, the plurality of rolling bodies 16 in the raceway close to the impeller 3 are located between the cross section of the first end 322 and the cross section of the second end 324, so that the support position between the shaft 12 and the shaft sleeve 14 in the bearing assembly 1 is close to the center of gravity of the impeller 3, which can reduce the influence of the amount of unbalance of the impeller 3 on the bearing assembly 1, thereby improving the reliability and service life of the product.

In an exemplary embodiment, the magnet assembly 2 comprises the magnetic ring 24 and the protective jacket 22 sleeved outside the magnetic ring 24, and the protective jacket 22 comprises the balancing portion 224 located at one end of the magnetic ring 24. In one aspect, the balancing portion 224 is located at the end away from the shaft sleeve 14, that is, the balancing portion 224 is located at the end portion of the rotor assembly and away from the center of gravity of the rotor assembly, which facilitates weight removal, and thereby can improve the weight removal efficiency and reliability. In another aspect, the balancing portion 224 is located at the end close to the sleeve 14, that is, the balancing portion 224 is provided between the bearing assembly 1 and the magnetic ring 24 and close to the center of gravity of the rotor, which facilitates shortening the axial length and thereby makes full use of the axial space and enlarges the applicable scope of the product.

According to still another aspect of the present disclosure, there is provided a draught fan, comprising the bearing assembly 1 according to any of the above-described embodiments; or the rotor assembly comprising the impeller 3 according to any of the above-described embodiments; or the rotor assembly comprising the magnet assembly 2 according to any of the above-described embodiments.

The draught fan provided by the present disclosure comprises the bearing assembly 1 of any of the above-described embodiments, and therefore has all of the advantageous effects of the bearing assembly 1; or comprises the rotor assembly comprising the impeller 3 in any of the above-described embodiments, and therefore has all of the advantageous effects of the rotor assembly comprising the impeller 3; or comprises the rotor assembly comprising the magnet assembly 2 in any of the above-described embodiments, and therefore has all of the advantageous effects of the rotor assembly comprising the magnet assembly 2, which will not be described further here.

For example, the draught fan provided by the present disclosure can be applied to hand-held vacuum cleaners and blowers. Of course, the motor can also be applied to other devices, all of which fall within the protection scope of the present disclosure without departing from the design concept of the present disclosure.

In the present disclosure, the term "a plurality of" means "two or more", unless otherwise explicitly defined. The terms "mounting", "connected", "connection", "fixing" and the like should be understood in a broad sense. For example, "connection" may be a fixed connection, a removable connection or an integral connection; the term "connected" may refer to being directly connected and may also refer to being indirectly connected through an intermediary. A person of ordinary skills in the art could understand the specific meaning of the terms in the present disclosure according to specific situations.

In the description of the present specification, the descriptions of the terms "one embodiment", "some embodiments" and "specific embodiments" and the like mean that specific features, structures, materials or characteristics described in conjunction with the embodiment or example are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. A bearing assembly comprising: a shaft sleeve comprising an inner wall, wherein a plurality of grooves are recessed into the inner wall in a circumferential direction of the bearing assembly, wherein a portion of the inner wall extends linearly from a first groove of the plurality of grooves to a second groove of the plurality of grooves, wherein the inner wall defines a passageway, a shaft extending along a longitudinal axis, wherein a portion of the shaft extends through the passageway of the inner wall, wherein a plurality of channels are defined in the shaft, wherein the plurality of channels correspond to the plurality of grooves respectively, wherein a respective channel and a respective groove collectively define a raceway, wherein the shaft is parallel to the portion of the inner wall; and a plurality of rolling bodies, disposed between the shaft and the shaft sleeve and movable in the raceway; wherein the shaft sleeve has an outer diameter of 13 mm, and the portion of the shaft that extends through the passageway of the inner wall has a diameter of 5 mm; and wherein a radial distance between the first groove and the shaft is equal to or greater than a radial distance between the portion of the inner wall and the shaft.

2. The bearing assembly according to claim 1, wherein:
the plurality of grooves comprise two grooves and the plurality of channels comprise two channels corresponding to the two grooves respectively, thereby defining a first raceway and a second raceway;
a first plane, in which the spherical centers of a plurality of the rolling bodies in the first raceway are located collectively, defines a first base surface;
a second plane, in which the spherical centers of a plurality of the rolling bodies in the second raceway are located collectively, defines a second base surface; and
the distance between the first base surface and the second base surface surfaces is within the range of 16 mm to 18 mm.

3. The bearing assembly according to claim 1, wherein:
the plurality of grooves comprise two grooves and the plurality of channels comprise two channels corresponding to the two grooves respectively, thereby defining a first raceway and a second raceway;
a plane, in which the spherical centers of a plurality of the rolling bodies in the first raceway are located collectively, defines a first base surface;
a plane, in which the spherical centers of a plurality of the rolling bodies in the second raceway are located collectively, defines a second base surface; and
the distance between the first base surface and the second base surface surfaces is within the range of 10 mm to 12 mm.

4. The bearing assembly according to claim 1, wherein:
one of the plurality of rolling bodies has a cross section that is perpendicular to the longitudinal axis of the shaft, the cross section defines a first circle, a track of the center of the first circle moving along the raceway defines a second circle, and the second circle has a diameter of 6.4 mm; and
the plurality of rolling bodies in the raceway are uniformly distributed in the circumferential direction of the shaft.

5. The bearing assembly according to claim 1, wherein:
the shaft is a through shaft; and
the shaft has a recess for receiving an adhesive.

6. The bearing assembly according to claim 1, wherein:
the plurality of rolling bodies and the shaft are both made of a metal material; or
the shaft is made of a metal material, and the plurality of rolling bodies are made of a ceramic material.

7. The bearing assembly according to claim 1, wherein:
the plurality of grooves comprise two grooves and the plurality of channels comprise two channels corresponding to the two grooves respectively, thereby defining a first raceway and a second raceway; and
the first raceway and the second raceway are provided with a same number of rolling bodies, and the number of rolling bodies disposed in the first raceway and the second raceway is 6 or 7.

8. A rotor assembly comprising:
the bearing assembly according to claim 1; and
an impeller disposed on the shaft of the bearing assembly.

9. The rotor assembly according to claim 8, wherein:
the impeller comprises a hub having a first end and a second end,
the first end of the hub has a first cross-sectional area and the second end of the hub has a second cross-sectional area, the first cross-sectional area being smaller than the second cross-sectional area, and
the shaft of the bearing assembly is mounted on the second end of the hub.

10. The rotor assembly according to claim 9, wherein:
the hub comprises a frustoconical portion and a ring portion, the frustoconical portion has a first end and a second end larger than the first end, and the ring portion is connected to the second end; and
the frusto-conical portion comprises a mounting portion provided to an interior of the frusto-conical portion, and the shaft passes through the ring portion to be connected to the mounting portion.

11. The rotor assembly according to claim 10, wherein:
a plurality of the rolling bodies in the raceway closest to the impeller are located at least partially within the ring portion.

12. The rotor assembly according to claim 10, wherein:
the shaft has a portion connected to the mounting portion in the direction of the longitudinal axis of the shaft, and the length of the portion is greater than 6 mm and smaller than 10 mm, or equal to 6 mm, or equal to 10 mm.

13. The rotor assembly according to claim 9, wherein:
the impeller further comprises a plurality of blades mounted on the hub;
the impeller is a mixed-flow impeller; and
the number of the plurality of blades is 7.

14. A rotor assembly comprising:
the bearing assembly according to claim 1; and
a magnet assembly disposed on the shaft of the bearing assembly.

15. The rotor assembly according to claim 14, wherein the magnet assembly comprises:
a magnetic ring; and
a protective jacket comprising a balancing portion and a reinforcing portion, the balancing portion and the reinforcing portion being connected to each other and jointly covering an outer surface of the magnetic ring, wherein the balancing portion is located at one end of the magnetic ring.

16. The rotor assembly according to claim 15, wherein:
the protective jacket is an integrally formed structure; and
the protective jacket is made of a non-magnetically conductive material.

17. The rotor assembly according to claim 15, wherein:
the magnetic ring is sleeved on the shaft, and
the distance between the magnetic ring and the shaft sleeve in the direction of the longitudinal axis of the shaft is greater than or equal to 3 mm.

18. A draught fan comprising the bearing assembly according to claim 1.

19. The bearing assembly according to claim 1, wherein the entirety of the portion of the inner wall is parallel to the longitudinal axis.

* * * * *